US006047789A

United States Patent [19]

Iwanaga

[11] Patent Number: 6,047,789

[45] Date of Patent: Apr. 11, 2000

[54] TOE ANGLE ADJUSTMENT MECHANISM FOR VEHICLE WHEELS

[75] Inventor: Yoshihisa Iwanaga, Kariya, Japan

[73] Assignee: Kabushiki Kaisha Toyoda Jidoshokki Seisakusho, Aichi-Ken, Japan

[21] Appl. No.: 08/922,663

[22] Filed: Sep. 3, 1997

[30] Foreign Application Priority Data

Sep. 4, 1996 [JP] Japan .................................... 8-234336

[51] Int. Cl.[7] ........................................................ B62D 5/06

[52] U.S. Cl. ............... 180/440; 280/86.758; 280/86.756; 280/93.511

[58] Field of Search ......................... 280/86.758, 86.756, 280/93.511; 180/440

[56] References Cited

U.S. PATENT DOCUMENTS

| | | | |
|---|---|---|---|
| 1,768,347 | 6/1930 | Trumble | 280/86.758 |
| 4,162,859 | 7/1979 | McAfee | 280/93.511 |
| 4,231,588 | 11/1980 | Wotton et al. | 280/86.756 |

FOREIGN PATENT DOCUMENTS

| | | |
|---|---|---|
| 47-24015 | 10/1972 | Japan . |

*Primary Examiner*—J. J. Swann
*Assistant Examiner*—James S. McClellan
*Attorney, Agent, or Firm*—Morgan & Finnegan, L.L.P.

[57] ABSTRACT

A vehicle having a toe angle adjustment mechanism. The vehicle has a frame member, a steerable wheel, a steering knuckle pivotally connecting the wheel to the frame member about a substantially vertical axis, a steering mechanism for steering the vehicle, and a steering actuator included as part of the steering mechanism for moving in a predetermined direction to cause a steering change. A transfer member is connected to the wheel for transferring a force applied by the actuator to the wheel to effect the steering change. The adjustment mechanism pivotally couples the distal end of the transfer member to distal end of the steering actuator about an adjustable pivot axis. The adjustment mechanism permits adjustment of the toe angle of the wheel and varies the position of the adjustable pivot axis with respect to one of the distal end portions to vary the toe angle.

8 Claims, 4 Drawing Sheets

12a 13 16 8a 12 14 17 8b 20 18 8c 7 15 18a 19 8 4

TOE ANGLE ADJUSTMENT MECHANISM FOR VEHICLE WHEELS

BACKGROUND OF THE INVENTION

The present invention relates to toe angle adjustment mechanisms that facilitate toe-in and toe-out adjustment of vehicle wheels.

There are industrial vehicles that employ a full hydraulic pressure system (FHPS) type rear axle. As shown in FIGS. 5(*a*) and 5(*b*), a typical FHPS type rear axle includes a rear axle beam 1. A wheel 2 is coupled to each end of the axle beam 1. A cylinder 5 is fixed longitudinally to the middle of the axle beam 1. A piston rod 4 extends outward from each end of the cylinder 5. The projection and retraction of the piston rod 4 turns each wheel 2 about an axis extending in a substantially vertical direction. This steers the vehicle.

Each wheel 2 is coupled to the axle beam 1 by means of a steering knuckle 3. When the wheel 2 is turned, the steering knuckle 3 is turned accordingly. The steering knuckle 3 is connected to the piston rod 4 by means of a rod end 7, which is secured to the distal end of the piston rod 4, a tie rod 18, and a ball joint.

The cylinder 5 is actuated by hydraulic pressure. The hydraulic pressure is applied by a steering valve, or ORBITROL, located below a steering wheel (not shown), which is arranged in front of the driver's seat. A nut portion 7*a* is provided on each rod end 7. The rod end 7 is threaded into the piston rod 4. The length of the piston rod 4 is adjusted by rotating the nut portion 7*a*.

When the steering wheel is at a neutral position, the vehicle moves straight. However, dimensional tolerances that are allowed when assembling the rear axle may cause the left and right wheels to aim in a direction that is not straight forward. This may result in side slipping.

To maintain the amount of side slipping within an allowable range, the nut portion 7*a* of each rod end 7 is turned to adjust the length of the piston rod 4. However, each rod end 7 must be rotated independently when turning the nut portion 7*a*. Thus, the rod end 7 must be disconnected from the associated tie rod 18 for adjustment. The rod end 7 and the tie rod 18 are reconnected after adjustment. Furthermore, exclusive tools are required to rotate the rod end 7. Thus, adjustment of the length of the piston rod 4 has been costly and inefficient.

Furthermore, the employment of a threaded adjusting mechanism together with a ball joint increases the size of the rod ends 7. This also results in cost increases.

SUMMARY OF THE INVENTION

Accordingly, it is an objective of the present invention to provide a toe angle adjustment mechanism for vehicle wheels that facilitates the adjustment of the toe angle and has a simplified structure.

To achieve the above objective, the present invention provides a vehicle having a frame member, a steerable wheel, a steering knuckle pivotally connecting the wheel to the frame member about a substantially vertical axis, a steering mechanism for steering the vehicle, and a steering actuator included as part of the steering mechanism for moving in a predetermined direction to cause a steering change. The steering actuator has a distal end portion. A transfer member is connected to the wheel for transferring a force applied by the actuator to the wheel to effect the steering change. The transfer member has a distal end portion. An adjustment mechanism pivotally couples the distal end portion of the transfer member to the distal end portion of the steering actuator about an adjustable pivot axis. The adjustment mechanism permits adjustment of the toe angle of the wheel and varies the position of the adjustable pivot axis with respect to one of the distal end portions to vary the toe angle.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1(*b*) is a front view showing the rear axle of FIG. 1(*a*);

FIG. 5(*b*) is a front view showing the rear axle of FIG. 5(*a*).

DETAILED DESCRIPTION OF THE PREFERRED EMBODIMENTS

A toe angle adjustment mechanism according to an embodiment of the present invention will now be described with reference to the drawings.

Figure 1:
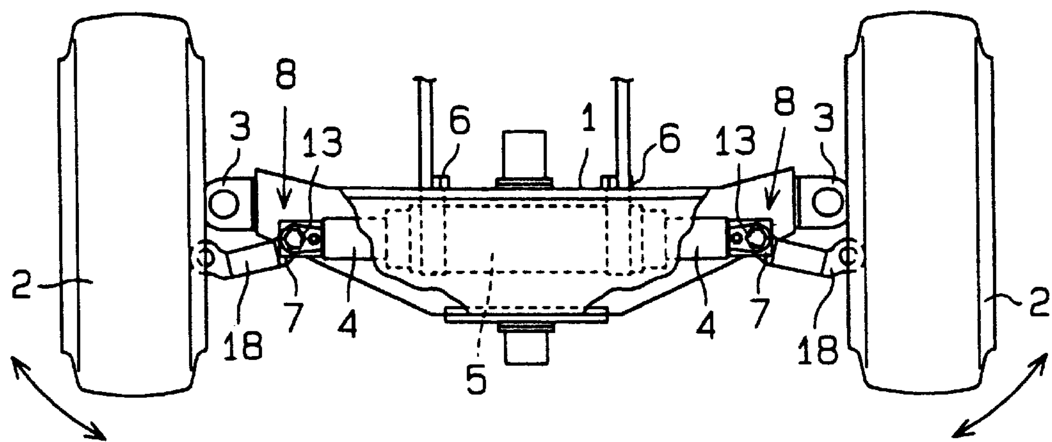
FIG. 1(*a*) is a plan view showing a rear axle provided with a toe angle adjustment mechanism according to the present invention.
Figure 1:
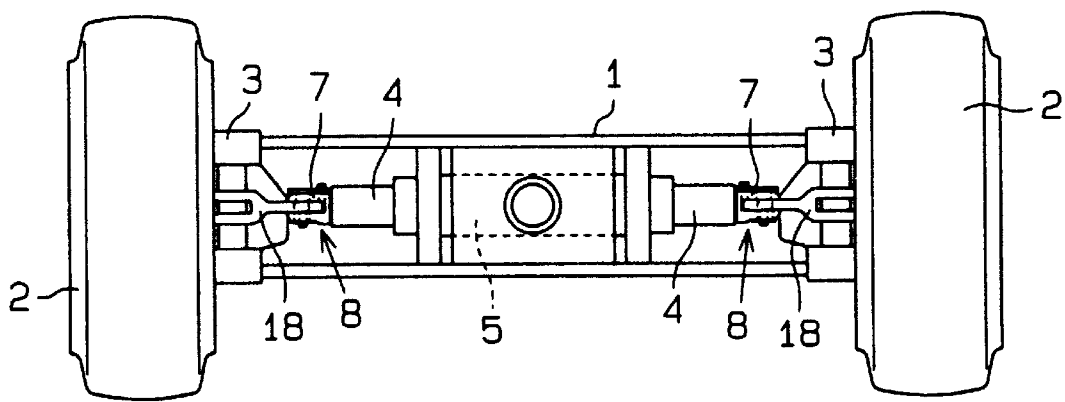

FIGS. 1(*a*) and 1(*b*) show a rear axle of a forklift. The rear axle includes a laterally extending rear axle beam 1, or frame member, which is fixed to the rear portion of the vehicle body. A wheel 2 is coupled to each end of the axle beam 1 by means of a steering knuckle 3. Each wheel 2 rotates about a horizontal axis and pivots about a vertical axis.

A cylinder 5, which serves as an actuator, is fastened to the middle of the axle beam 1 by bolts 6 and is arranged extending longitudinally along the beam 1. A single piston rod 4 extends outward from each end of the cylinder 5. A rod end 7 is integrally fixed to each end of the piston rod 4. The cylinder 5 is actuated by hydraulic pressure. The hydraulic pressure is applied by a steering valve, or ORBITROL, located below a steering wheel (not shown), which is arranged in front of the driver's seat.

Figure 2:
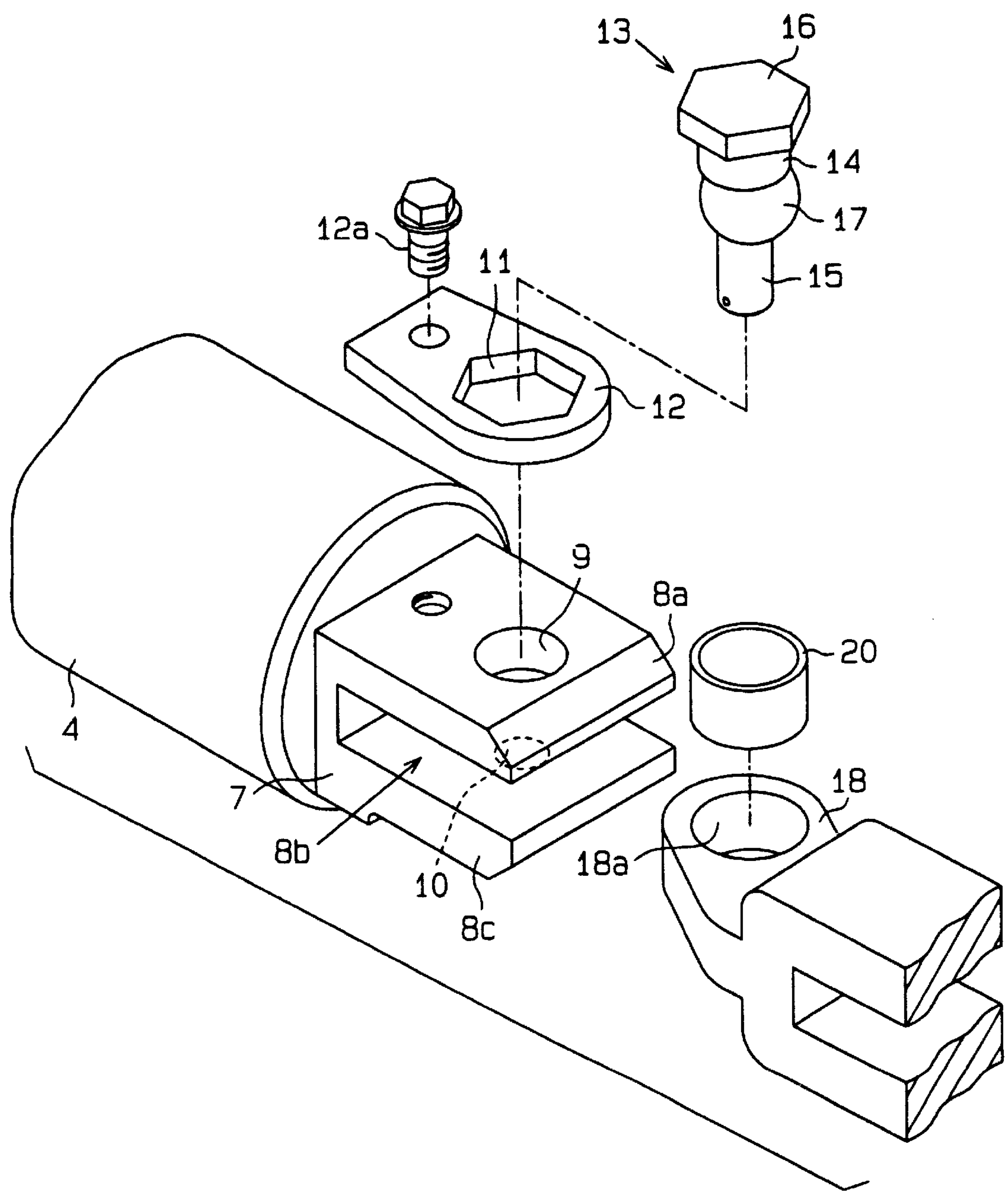
FIG. 2 is an exploded view showing the portion connecting the rod end and the tie rod.

The rear axle is symmetrical about a central vertical plane. Therefore, only one side of the rear axle will be described with reference to FIG. 2. A connecting portion 8, which is bifurcated into a first connecting piece 8*a* and a second connecting piece 8*c*, is provided at the distal end of the rod end 7. A slot 8*b*, which is slightly wider than the thickness of a tie rod 18, is defined between the first and second connecting pieces 8*a*, 8*c*. A first bore 9 extends through the first connecting piece 8*a*, while a second bore extends through the second connecting piece 8*c*. A lock plate 12 having a hexagonal hole 11, which constitutes part of a rotation restricting mechanism, is fastened to the outer surface of the first connecting piece 8*a* by a bolt 12*a*. The first bore 9, the second bore 10, and the hexagonal hole 11 are aligned coaxially. The diameter of the first bore 9 is greater than that of the second bore 10.

A coupling pin 13 has first and second sections 14, 15 that correspond to the bores 9, 10, respectively, and a head 16 corresponding to the hexagonal hole 11. An eccentric section 17 extends between the first and second sections 14, 15. The outer surface of the eccentric section 17 is spherical.

The tie rod 18 connects the steering knuckle 3 to the piston rod 4. A pin bore 18*a* is provided on the end of the tie rod 18. The tie rod 18 and the steering knuckle 3 are rotatably coupled to each other by a known coupling device.

Figure 3:
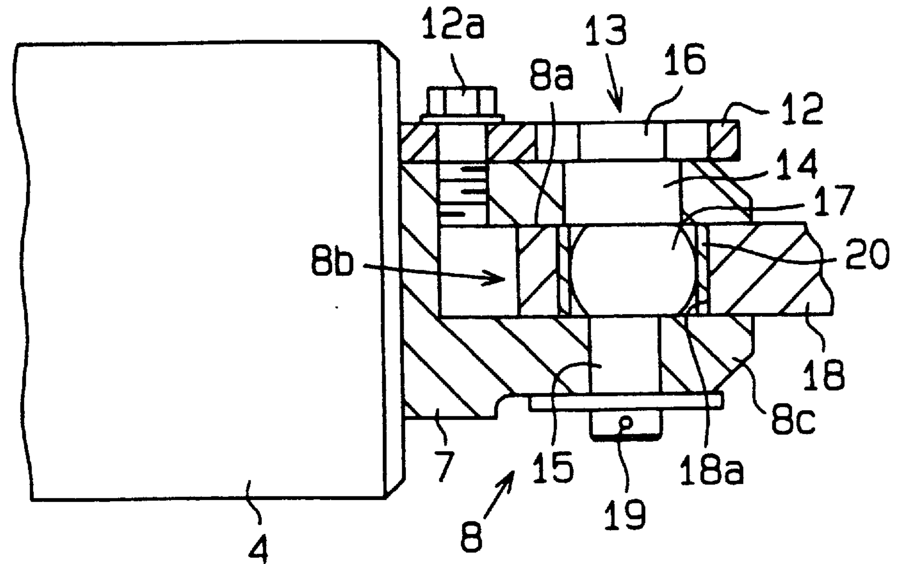
FIG. 3 is a cross-sectional view showing the joint between the rod end and the tie rod.

The rod end 7 is connected to the tie rod 18 in the following manner. As shown in FIG. 3, the distal end of the tie rod 18 is fit into the slot 8*b*. The pin bore 18*a* is located between the first bore 9 and the second bore 10. The coupling pin 13 is then inserted through the first bore 9, the pin bore 18*a*, and the second bore 10. When the head 16 is fit into the hexagonal hole 11, a lock pin 19 is used to lock the projecting lower end of the coupling pin 13. Since the slot 8*b* is slightly wider than the thickness of the tie rod 18, a slight clearance is formed between the tie rod 18 and the walls of the slot 8*b*.

A sleeve 20 is arranged between the eccentric section 17 of the coupling pin 13 and the wall of the pin bore 18*a*. However, the sleeve 20 is not necessary if the eccentric section 17 can easily slide against the pin bore 18*a* without undue wear.

At the joint between the rod end 7 and the tie rod 18, the spherical surface of the eccentric section 17 contacts the wall of the pin bore 18*a* by means of the sleeve 20. Thus, the movement of the rod end 7 is positively transmitted to the tie rod 18 by the coupling pin 13. The tie rod 18 pivots about the eccentric section 17 of the connecting pin 13 in accordance with the movement of the rod end 7. The eccentric shaft portion 17 functions in the same manner as a ball joint.

Figure 4:
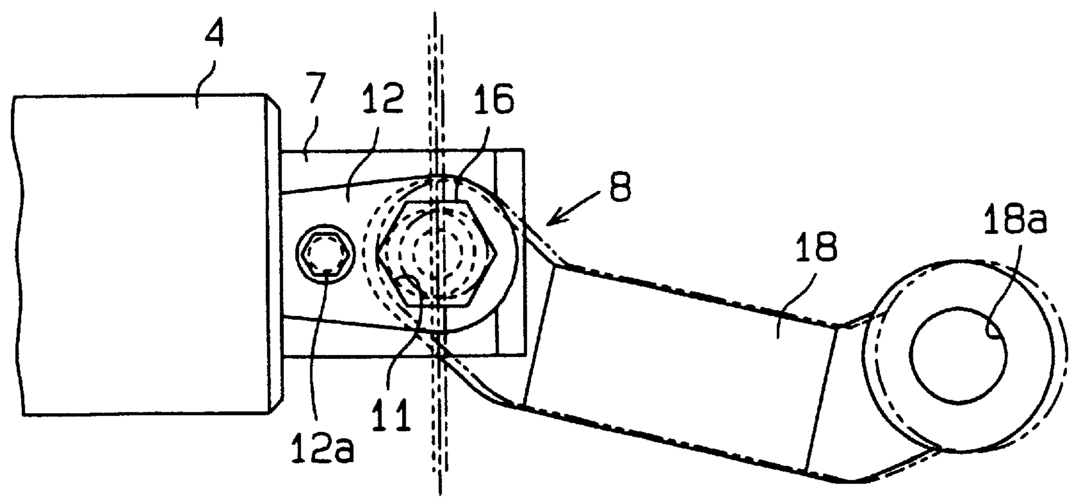
FIG. 4 is an explanatory drawing showing the movement of the toe angle adjustment mechanism.
Figure 5A:
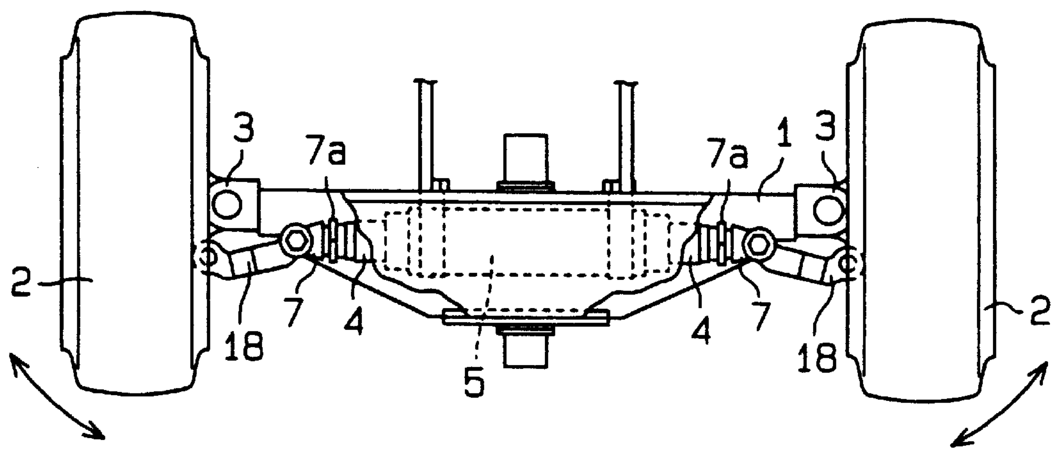
FIG. 5(*a*) is a plan view showing the prior art rear axle.
Figure 5B:
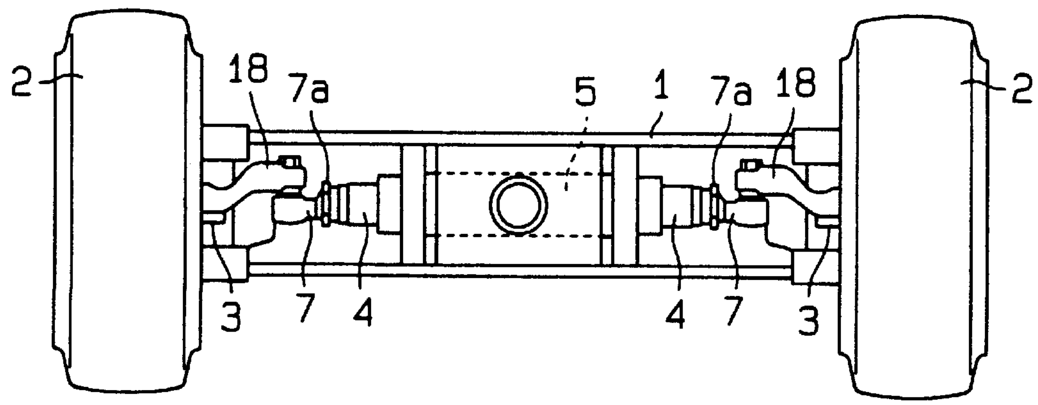

The center of the eccentric section 17 is offset from the axis of the coupling pin 13 by a predetermined distance. Thus, when the coupling pin 13 is rotated about its axis, the center of the eccentric section 17 orbits the axis of the pin 13. The locus of the center of the eccentric section 17 defines a circle, the radius of which is equal to the offset distance. Hence, the rotation of the coupling pin 13 alters the relative position of the tie rod 18 and the rod end 7 (FIG. 4). This facilitates toe adjustment. In addition, since this structure is compact and simple, costs are reduced.

The head 16 of the coupling pin 13 is fitted into the hexagonal hole 11 so as to restrict rotation of the pin 13. By removing the lock pin 19, the coupling pin 13 may be moved upward until the head 16 comes out of the hexagonal hole 11. This enables the head 16 to be turned in increments of 60 degrees. The angular interval of 60 degrees allows alignment between the outer surface of the head 16 and the wall of the hexagonal hole 11. The turning of the coupling pin 13 changes the position at which the tie rod 18 is connected to the rod end 7 in the axial direction of the cylinder 5. This adjusts the toe angle of the wheel.

In the above embodiment, the hexagonal head of the coupling pin is aligned with and fit into the hexagonal hole that is provided in the lock plate so as to restrict rotation of the coupling pin. However, the portion of engagement between the coupling pin and the lock plate need not be hexagonal as long as it is polygonal. Furthermore, the lock plate may be eliminated by providing a polygonal hole in the rod end. Furthermore, the rotation restricting means is not limited to a polygonal engagement mechanism and may employ other restricting mechanisms. When using polygonal engagement mechanisms, it is preferable that the number of sides be as high as possible to allow fine adjustment.

In the above embodiment, a slot is provided in the rod end. However, the slot may instead be provided in the tie rod. In this case, the lock plate is also arranged on the tie rod.

The eccentric section does not necessarily have to be provided at the middle of the coupling pin and may be provided at any position on the pin.

The outer surface of the eccentric section need not be spherical and may be cylindrical. However, in this case, a separate ball joint will be necessary. Thus, such structure may not be cost efficient.

The lock plate 12 and the coupling pin 13 do not necessarily have to be arranged on the upper surface of the rod end 7 and may be arranged on the lower surface instead.

The toe angle adjustment mechanism may be employed anywhere as long as it defines a rotatable joint with a member that is mechanically connected to the steering knuckle. This enables the advantageous effects of the above embodiment to be obtained. The application of the present invention is not limited to FHPS type axles and may be applied to vehicles that employ separate type linkage power steering systems. In such a system, the present invention may be applied to portions connecting a pitman arm to a steering connecting rod or to portions connecting a knuckle arm and a tie rod.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A vehicle comprising:

a frame member;

a steerable wheel;

a steering knuckle pivotally connecting the wheel to the frame member about a substantially vertical axis;

a steering mechanism for steering the vehicle;

a steering actuator included as part of the steering mechanism for moving in a predetermined direction to cause a steering change, the steering actuator having a distal end portion;

a transfer member connected to the wheel for transferring a force applied by the actuator to the wheel to effect the steering change, the transfer member having a distal end portion;

an adjustment mechanism for pivotally coupling the distal end portion of the transfer member to the distal end portion of the steering actuator about an adjustable pivot axis, wherein the adjustment mechanism permits adjustment of the toe angle of the wheel, wherein the adjustment mechanism varies the position of the adjustable pivot axis with respect to one of the distal end portions to vary the toe angle, wherein the adjustment mechanism includes a coupling pin passing through the distal end portions of the actuator and the transfer member, wherein the coupling pin has a polygonal shaped head, an axis, and an eccentric section, wherein the center of the eccentric section orbits the coupling pin axis when the coupling pin rotates, and wherein the eccentric section defines the adjustable pivot axis, and wherein the adjustment mechanism includes a locking device for preventing the coupling pin from rotating with respect to one of the distal end portions, wherein the locking device includes a plate that is secured to one of the distal ends, wherein the plate has a polygonal hole formed therein for engagement with the head of the coupling pin.

2. The vehicle of claim 1, wherein the plate is removable to free the head of the coupling pin.

3. A coupling pin for a vehicle, the vehicle comprising:

a frame member;

a steerable wheel;

a steering knuckle pivotally connecting the wheel to the frame member about a substantially vertical axis;

a steering mechanism for steering the vehicle;

a steering actuator included as part of the steering mechanism for moving in a predetermined direction to cause a steering change, the steering actuator having a distal end portion;

a transfer member connected to the wheel for transferring a force applied by the actuator to the wheel to effect the steering change, the transfer member having a distal end portion;

an adjustment mechanism for pivotally coupling the distal end portion of the transfer member to the distal end portion of the steering actuator about an adjustable pivot axis, wherein the adjustment mechanism permits adjustment of the toe angle of the wheel, and wherein the adjustment mechanism varies the position of the adjustable pivot axis with respect to one of the distal end portions to vary the toe angle, the coupling pin comprising:

a first cylindrical section;

a second cylindrical section spaced from and axially aligned with the first cylindrical section; and a round eccentric section axially offset from the first cylindrical section, wherein the eccentric section defines the adjustable pivot axis when installed in the vehicle and is located between the first and second cylindrical sections.

4. The coupling pin according to claim 3, wherein the coupling pin has an exterior surface engageable with a mating surface associated with one of the distal ends to prevent rotation.

5. The coupling pin according to claim 4, wherein the exterior surface of said coupling pin engageable with one of the distal ends is movable relative thereto disengage it from said mating surface and thereby permit said coupling pin to be rotated for adjustment.

6. The coupling pin according to claim 5, wherein the coupling pin is moveable in direction of the axis of the first cylindrical section of the coupling pin to disengage the locking portion from one of the distal end portions.

7. A vehicle comprising:

a frame member;

steerable wheel;

a steering knuckle pivotally connecting the wheel to the frame member about a substantially vertical axis;

a steering mechanism for steering the vehicle;

a steering actuator included as part of the steering mechanism for moving in a predetermined direction to cause a steering change, the steering actuator having a distal end portion;

a transfer member connected to the wheel for transferring a force applied by the actuator to the wheel to effect the steering change, the transfer member having a distal end portion;

an adjustment mechanism for pivotally coupling the distal end portion of the transfer member to the distal end portion of the steering about an adjustable pivot axis, wherein the adjustment mechanism permits adjustment of the toe angle of the wheel, the adjustment mechanism varying the position of the adjustable pivot axis with respect to one of the distal end portions to vary the toe angle, the adjustment mechanism including a coupling pin passing through the distal end portions of the actuator and the transfer member, the coupling pin having a portion containing locking surfaces, an axis, and an eccentric section, the center of the eccentric section orbits the coupling pin axis when the coupling pin rotates, wherein the eccentric section defines the adjustable pivot axis, said locking surfaces being engageable with a mating recess associated with the distal end portion of one of the actuator and the transfer member to prevent the coupling pin from rotating with respect to one of the distal end portions and being selectively disengageable form said mating recess to permit rotation of the adjustment pin when adjusting the toe angle of the wheel.

8. A vehicle comprising:

a frame member;

a steerable wheel;

a steering knuckle pivotally connecting the wheel to the frame member about a substantially vertical axis;

a steering mechanism for steering the vehicle;

a steering actuator included as part of the steering mechanism for moving in a predetermined direction to cause a steering change;

a transfer member connected to the wheel for transferring a force applied by The actuator to the wheel to effect the steering change, one of the transfer member and the actuator having a recess formed therein;

a rotatable adjustment mechanism for pivotally coupling the transfer member to the steering actuator about an adjustable pivot axis. wherein the adjustment mechanism permits adjustment of the toe angle of the wheel, and the adjustment mechanism varying the position of the adjustable pivot axis with respect to the adjustment mechanism to vary the toe angle, the adjustment mechanism including an eccentric section defining the position of the adjustable pivot axis by rotation thereof to adjust the toe angle, the adjustment mechanism further including a locking surface portion engageable with the recess formed in one of the transfer member and the steering actuator to lock said adjustment mechanism against rotation and selectively disengageable from said recess to permit rotation of the adjustment mechanism when adjusting the toe angle of the wheel.

* * * * *